(12) United States Patent  
Wilson et al.

(10) Patent No.: US 8,705,560 B2  
(45) Date of Patent: *Apr. 22, 2014

(54) MULTI-BEAM CELLULAR COMMUNICATION SYSTEM

(75) Inventors: Fiona Wilson, Spellbrook (GB); Simon Gale, Bishops Stortford (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,514

(22) Filed: Sep. 14, 2012

(65) Prior Publication Data

US 2013/0045767 A1      Feb. 21, 2013

Related U.S. Application Data

(60) Continuation of application No. 12/880,246, filed on Sep. 13, 2010, now Pat. No. 8,432,929, which is a division of application No. 10/385,792, filed on Mar. 11, 2003, now Pat. No. 7,826,471.

(51) Int. Cl.
   *H04B 7/212*      (2006.01)

(52) U.S. Cl.
   USPC ........................................... 370/442; 370/311

(58) Field of Classification Search
   None
   See application file for complete search history.

(56) References Cited

U.S. PATENT DOCUMENTS

| | | | |
|---|---|---|---|
| 5,029,183 A | | 7/1991 | Tymes |
| 5,235,612 A | * | 8/1993 | Stilwell et al. ................ 375/144 |
| 5,565,873 A | | 10/1996 | Dean |
| 5,892,769 A | * | 4/1999 | Lee ................................ 370/447 |
| 6,005,854 A | | 12/1999 | Xu et al. |
| 6,055,431 A | | 4/2000 | Dybdal |
| 6,356,767 B2 | | 3/2002 | Froula |
| 6,377,559 B1 | | 4/2002 | Haardt |
| 6,477,158 B1 | | 11/2002 | Take |
| 6,542,485 B1 | | 4/2003 | Mujtaba |
| 6,891,813 B2 | | 5/2005 | Feria et al. |

(Continued)

FOREIGN PATENT DOCUMENTS

GB       2378857        2/2003

OTHER PUBLICATIONS

Dennet, S.; "The CDMA2000 ITU-R RTT Candidate Submission"; Jul. 27, 1998, XP 002427031 pp. 1-6 refer to Prior art in U.S. Appl. No. 12/880,246.

(Continued)

*Primary Examiner* — Robert Wilson
(74) *Attorney, Agent, or Firm* — Fish & Richardson P.C.

(57) ABSTRACT

A communication system includes base stations having an antenna arrangement per sector. Each of the antenna arrangements has an antenna element for generating an array of narrow beams covering the sector. Timeslots are simultaneously transmitted over each beam to generate successive sets of simultaneously transmitted timeslots per sector that are each split into orthogonal codes. Common overhead channels are allocated for successive sets of timeslots, which are allocated to the same subset of codes of each timeslot in the set. For successive sets of timeslots, different data is allocated to the same subset of codes of each timeslot in the set. This generates a sector-wide beam carrying the common overhead channels and a plurality of narrow beams, each carrying different data. An inter-beam handoff scheme allows the antenna arrangement to simultaneously transmits data to a user equipment located in a cusp region between adjacent beams on the adjacent beams.

20 Claims, 4 Drawing Sheets

(56) References Cited

U.S. PATENT DOCUMENTS

| | | |
|---|---|---|
| 6,907,272 B2 | 6/2005 | Roy |
| 7,043,393 B2 * | 5/2006 | Fuller et al. ............ 702/127 |
| 7,095,987 B2 | 8/2006 | Brothers et al. |
| 7,133,379 B2 | 11/2006 | Yoshii et al. |
| 7,826,471 B2 * | 11/2010 | Wilson et al. ............ 370/442 |
| 8,432,929 B2 * | 4/2013 | Wilson et al. ............ 370/442 |
| 2002/0072393 A1 | 6/2002 | McGowan et al. |
| 2002/0105929 A1 | 8/2002 | Chen et al. |
| 2004/0179544 A1 | 9/2004 | Wilson et al. |
| 2010/0329215 A1 | 12/2010 | Wilson et al. |

OTHER PUBLICATIONS

Giuliano, R. et al.; "Smart Cell Sectorization for Third Generation CDMA Systems"; Wireless Communications and Mobile Computing 2002; pp. 253-267, Refer to prior art in U.S. Appl. No. 12/880,246.

Motorola, Inc.; "Technical Overview of 1xEV-DV"; Global Telecom Solution Sector; Sep. 6, 2002, XP-002427030 pp. 1-24 refer to prior art in U.S. Appl. No. 12/880,246.

Office Action issued in U.S. Appl. No. 10/385,792 on Jun. 12, 2007; 23 pages.

Office Action issued in U.S. Appl. No. 10/385,792 on Nov. 13, 2007; 23 pages.

Advisory Action issued in U.S. Appl. No. 10/385,792 on Mar. 26, 2008; 3 pages.

Office Action issued in U.S. Appl. No. 10/385,792 on Jun. 17, 2008; 19 pages.

Office Action issued in U.S. Appl. No. 10/385,792 on Dec. 16, 2008; 22 pages.

Advisory Action issued in U.S. Appl. No. 10/385,792 on Mar. 23, 2009; 3 pages.

Office Action issued in U.S. Appl. No. 10/385,792 on Jun. 8, 2009; 23 pages.

Office Action issued in U.S. Appl. No. 10/385,792 on Nov. 27, 2009; 13 pages.

Notice of Allowance issued in U.S. Appl. No. 10/385,792 on Jun. 14, 2010; 11 pages.

Office Action issued in U.S. Appl. No. 12/880,246 on Aug. 16, 2012; 9 pages.

Office Action issued in U.S. Appl. No. 12/880,246 on Dec. 6, 2012; 9 pages.

Notice of Allowance issued in U.S. Appl. No. 12/880,246 on Feb. 8, 2013; 8 pages.

* cited by examiner

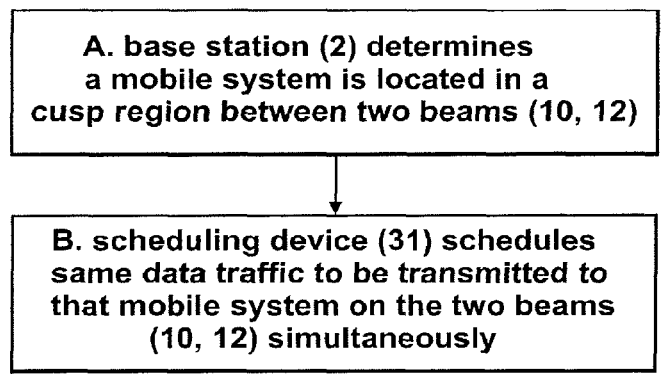
*Fig. 6*
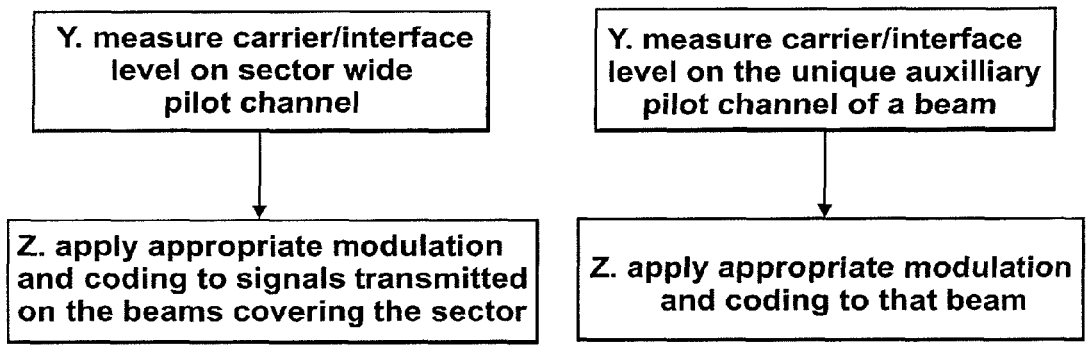
*Fig. 7A*  *Fig. 7B*

MULTI-BEAM CELLULAR COMMUNICATION SYSTEM

This application is a continuation of (and claims the benefit of priority under 35 USC §120 to) U.S. application Ser. No. 12/880,246 titled "MULTI-BEAM CELLULAR COMMUNICATION SYSTEM", filed on Sep. 13, 2010, which is a divisional of U.S. application Ser. No. 10/385,792 titled "MULTI-BEAM CELLULAR COMMUNICATION SYSTEM", filed on Mar. 11, 2003, all of which are incorporated by reference herein.

FIELD OF THE INVENTION

This invention relates to multi-beam cellular communication systems and in particular to methods and apparatus for increasing the capacity of such systems.

BACKGROUND OF THE INVENTION

Digital cellular systems, such as code Division Multiple Access (CDMA) and Universal Mobile Telephony System (UMTS) systems, are currently used for providing telecommunications to stationary and mobile end user equipments. The mobile end user equipments may be mobile stations, for example mobile Telephones and mobile computing devices. Such digital cellular systems divide a geographical area to be covered by the communication system into a plurality of cell areas. Within each cell is positioned a base station with which a plurality of end user equipments located within the cell communicate.

In general it is desired to have as few base stations as possible, as they are expensive, require extensive effort in obtaining planning permission and in some areas suitable base station sites may not be available. In order to have as few base stations as possible, each base station should ideally have as large a capacity as possible in order to service as large a number of end user equipments as possible.

One method of achieving an increase in capacity in a CDMA system is described in US patent application 2002/0072393 of McGowan et al. This involves the replacement of a sector wide beam width antenna with an antenna array that allows the formation of a number of narrower beams that cover the area of the original wide beam. The signal for a particular mobile station can then be sent and received only over the beam or beams that are useful for that mobile station. Such multiple narrow beams can be used for traffic channels, whereas overhead channels can be transmitted over the sector wide beam so that the overhead channels, including a pilot channel, are common to all the narrow beams in the sector. McGowan at at provides an antenna array for providing fixed narrow beams for transmitting and receiving traffic channels and for broadcasting common overhead channels over the sector using the same antenna array. This is achieved by providing appropriate frequency or phase offsets between the multiple fixed beams.

Significant optimisation of the system taught in McGowan et al is required for it to be deployed in evolving third generation (3G) communications systems, such as 1xEV-DV (1xEVolution for Data and Voice), 1xEV-DO (1x: EVolution for Data Only) and HSDPA (High Speed Data Packet Access an extension to UMTS (Universal Mobile Telephony System). Also, there is a further need to increase base station capacity.

SUMMARY OF THE INVENTION

The present invention relates generally to a cellular communication system in which each cell sector is covered by a multi-beam antenna array in which coded timeslots, which may be orthogonally coded timeslots, are transmitted on each beam in the sector wherein the codes are re-used in the beams in the sector to simultaneously send different data traffic to end user equipments on the different beams. A pilot channel common to all the beams is sent simultaneously to end user equipments in each beam on the same code.

According to a first aspect of the present invention there is provided a method for use in a cellular communication system comprising at least one base station, the or each of which comprises an antenna arrangement per base station sector for generating an array of narrow beams covering the sector, which method comprising the steps of:
 Simultaneously transmitting timeslots over each beam;
 generating multiple codes in each time slot;
 transmitting the same overhead channels including a pilot channel to end user equipments on each beam in a sector using the same sub-set of codes; and
 transmitting different data traffic to end user equipments on different beams in a sector by re-using the same codes in each beam.

The simultaneous transmission of timeslots over each beam generates successive sets of simultaneously transmitted times lots and the step of transmitting the same overhead channels may comprises the step of allocating the same sub-set of codes in each times lot of a set of timeslots to common overhead channels, including a pilot channel, and the step of transmitting different data traffic may comprise the step of allocating a sub-set of codes in each timeslot of a set of times lots to different data traffic.

According to a second aspect of the present invention there is provided a cellular communication system comprising at least one base station the or each of which comprises an antenna arrangement per base station sector, each of Which antenna arrangements has a beamforming device for generating an array of narrow beams covering the sector, over each of which beams times lots are simultaneously transmitted which timeslots are each split into multiple codes, wherein the or each base station is arranged to transmit the same overhead channels including a pilot channel to end user equipments in each beam in a sector using the same sub-set of codes and to transmit different data traffic to end user equipments on different beams in a sector by re-using the same codes in each beam.

The transmission of timeslots by the antenna arrangement generates successive sets of simultaneously transmitted timeslots per sector and the communication system may additionally include a base station controller for allocating the common overhead channels to the same sub-set of codes of each timeslot in a set of timeslots and for allocating different data traffic to a sub-set of codes of each timeslot in a set of timeslots.

According to a third aspect of the present invention there is provided computer readable media for installation on a base station controlling device of a cellular communication system for controlling a base station which comprises an antenna arrangement per base station sector for generating an array of narrow beams covering the sector, in which each antenna arrangement simultaneously transmits timeslots over each beam to generate successive sets of simultaneously transmitted timeslots and in which each time slot is split into multiple codes; which computer readable media carries out the steps of:
 allocating the same sub-set of codes in each timeslot of a set of timeslots to common overhead channels including a common pilot channel; and allocating a sub-set of codes in each timeslot of a set of timeslots to different data traffic so as to transmit different data traffic on different beams by re-using the same codes in each beam.

According to a fourth aspect of the present invention there is provided a base station of a cellular communication system comprising an antenna arrangement per base station sector, each of which antenna arrangements has a beamforming device for generating an array of narrow beams covering the sector, over each of which beams timeslots are simultaneously transmitted which timeslots are each spilt into multiple codes, wherein each base station is arranged to transmit common overhead channels including a pilot channel to end user equipments in each beam in a sector using the same sub-set of codes and to transmit different data traffic to end user equipments on different beams in a sector by re-using the same codes in each beam.

The transmission of times lots by the antenna arrangement generates successive sets of simultaneously transmitted timeslots per sector and the base station may include a scheduling device for allocating the common overhead channels to the same sub-set of codes of each timeslot in a set of timeslots and for allocating different data traffic to a sub-set of codes of each timeslot in a set of timeslots.

The first to fourth aspect of the present invention enable data traffic to be transmitted simultaneously on all beams of a multi-beam antenna arrangement within a cell sector, without re-use of pilot channel codes. Therefore, a large increase in capacity is achieved without Introducing pilot channel interference problems. The present invention relies on the spatial separation of the beams for an end user equipment to discriminate between the beams.

The multiple codes may be orthogonal codes such as Walsh codes which are suitable for use in CDMA systems or OVSF (Orthogonal Variable Spreading Factor) codes which are suitable for use in UMTS systems. Also, Gold or other pseudo random codes could be used.

Due to the reliance on the spatial separation of the beams to discriminate between the beams, it is desirable to operate an inter beam handoff scheme to reduce the loss of data traffic when an end user equipment enters a region of high carrier/interference levels, such as a cusp region between adjacent beams. In this case when it is determined, for example by a processor of the base station, that an end user equipment is located in such a region, in response to such a determination data traffic may be sent to that end user equipment on the same codes simultaneously on multiple beams, for example by a base station scheduling device.

In addition because spatial separation is relied upon to discriminate between beams it is useful to apply adaptive modulation and coding (AMC) to the data traffic transmitted over the beams. AMC can be effectively exploited according by the present invention because traffic is sent on all of the beams in a sector simultaneously and so a stable interference environment is provided. In one embodiment the carrier/interference level on the common pilot channel is measured and in response to the measured level appropriate modulation and coding is applied to the signals transmitted on the beams. In an alternative embodiment, which has the advantage of not requiring an inter-beam handoff scheme in which data is sent on multiple beams, a unique auxiliary pilot signal may be transmitted on each beam in the sector and the carrier/interference level on the auxiliary pilot signal of a beam can be determined and in response to the determined level appropriate modulation and coding can be applied to the signals transmitted on that beam. The carrier/interference level of the best beam in a sector for an end user equipment, i.e. the beam on which data traffic to that end user equipments is sent can be determined by measuring the carrier/interference level for the auxiliary pilot in the best beam and then subtracting the measured carrier level of the auxiliary pilots in the other beams in that sector.

Due to the reliance on spatial separation to discriminate between beams in a sector, it may be advisable to allocate sub-sets of codes to different data traffic which sub-sets include a different number of codes in simultaneously transmitted timeslots of adjacent beams. Then if an end user equipment mistakenly demodulates data traffic sent on a different beam from that intended, the data packet will not be of the size expected by that end user equipment and so will fail its physical layer error checking. Thus, any such error can be quickly corrected.

According to a fifth aspect of the present invention there is provided a handoff method for use in a base station of a cellular communication system comprising at least one antenna arrangement for generating an array of narrow beams for covering a sector wherein an end user equipment located in the sector discriminates between the beams in the sector only by the spatial separation of the beams and in which different data traffic signals are simultaneously transmitted to end user equipments on each beam, comprising the steps of:
determining when an end user equipment is located in a high interference region of the sector, and
in response to such a determination simultaneously transmitting data traffic to that end user equipment on at least two beams of the sector.

According to a sixth aspect of the present invention there is provided a base station of a cellular communication system comprising at least one antenna arrangement for generating an array of narrow beams for covering a sector wherein an end user equipment located in the sector discriminates between the beams only by the spatial separation of the beams in the sector and in which different data traffic signals are simultaneously transmitted to end user equipments on each beam, wherein the base station includes a processing device for determining when an end user equipment is located in a high interference region of the sector and in response to such a determination the antenna arrangement is arranged to simultaneously transmit data traffic to that end user equipment on at least two beams of the sector.

According to a seventh aspect of the present invention there is provided computer readable media for installation on a base station of a cellular communication system which base station comprises at least one antenna arrangement for generating an array of narrow beams for covering a sector wherein an end user system located in the sector discriminates between the beams only by the spatial separation of the beams in the sector and in which different data traffic signals are transmitted simultaneously to end user equipments on each beam, wherein the computer readable media carries out the steps of:
determining when an end user equipment is located in a high interference region between two adjacent beams; and
in response to such a determination simultaneously scheduling data traffic to that end user equipment on at least two beams in the sector.

According to the fifth, sixth and seventh aspects of the present invention the high interference region of the sector may be a cusp region between two adjacent beams, in which case data traffic may be simultaneously transmitted to the end user equipment on at least both of the adjacent beams.

The present invention according to the fifth, sixth and seventh aspect of the present invention provides a scheme for inter-beam handoff for reducing the loss of traffic to end user systems where different traffic is sent simultaneously on the different beams and only spatial separation is used by the end user equipments to distinguish between the beams. This handoff scheme is of particular use where different data traffic signals are transmitted simultaneously to end user equipments on all beams in a sector.

According to an eighth aspect of the present invention there is provided a method for use in a base station of a cellular communication system which base station comprises "at least one antenna arrangement for generating an array of narrow beams for covering a sector wherein an end user system located in the sector discriminates between the beams in the sector only by the spatial separation of the beams, comprising the steps of:

simultaneously transmitting different data traffic packets to end user equipments on each beam, and simultaneously transmitting data traffic packets of different lengths on adjacent beams.

According to a ninth aspect of the present invention there is provided a base station of a cellular communication system comprising at least one antenna arrangement for generating an array of narrow beams for covering a sector wherein an end user system located in the sector discriminates between the beams only by the spatial separation of the beams in the sector, the base station comprising a scheduling device for simultaneously scheduling different data traffic packets on each beam and for simultaneously scheduling data traffic packets of different lengths on adjacent beams.

The present invention according to the eighth and ninth aspects of the present invention provides an arrangement whereby wrongly demodulated packets can be identified quickly by the physical layer error checking where the data packet from an adjacent beam to the servicing beam is demodulated. The error checking is failed because the data packet will be of a different length from the expected packet. Timeslots may be simultaneously transmitted over each beam and multiple codes may be generated in each time slot, in which case the data packets may be formed from sub-sets of codes, which codes may be orthogonal codes such as Walsh codes or OVSF codes. Two data packets may be formed from each of two sub-sets of Walsh codes in each time slot in which the two sub-sets include a different number of Walsh codes.

Other aspects and features of the present invention will become apparent to those ordinarily skilled in the art upon review of the of the following description of specific embodiments of the invention in conjunction with the accompanying Figures.

DESCRIPTION OF DRAWINGS

In order that the present invention is more fully understood and to show how the same may be carried into effect, reference shall now be made, by way of example only to the Figures as shown in the accompanying drawing sheets, wherein:

FIG. 6 shows a flow chart of the steps in an inter-beam handoff scheme according to the present invention;

FIG. 7A shows a flow chart of the steps of a first adaptive modulation and coding scheme applied to the signals transmitted on the beams of the antenna system of FIG. 1; and FIG. 7B shows a flow chart of the steps of a second adaptive modulation and coding scheme applied to the signals transmitted on the beams of the antenna system of FIG. 1.

DETAILED DESCRIPTION OF THE PREFERRED EMBODIMENTS

There will now be described by way of example the best mode contemplated by the inventor for carrying out the invention. In the following description, numerous specific details are set out in order to provide a complete understanding of the present invention. It will be apparent, however, to those skilled in the art that the present invention may be put into practice with variations of the specific.

Figure 1:
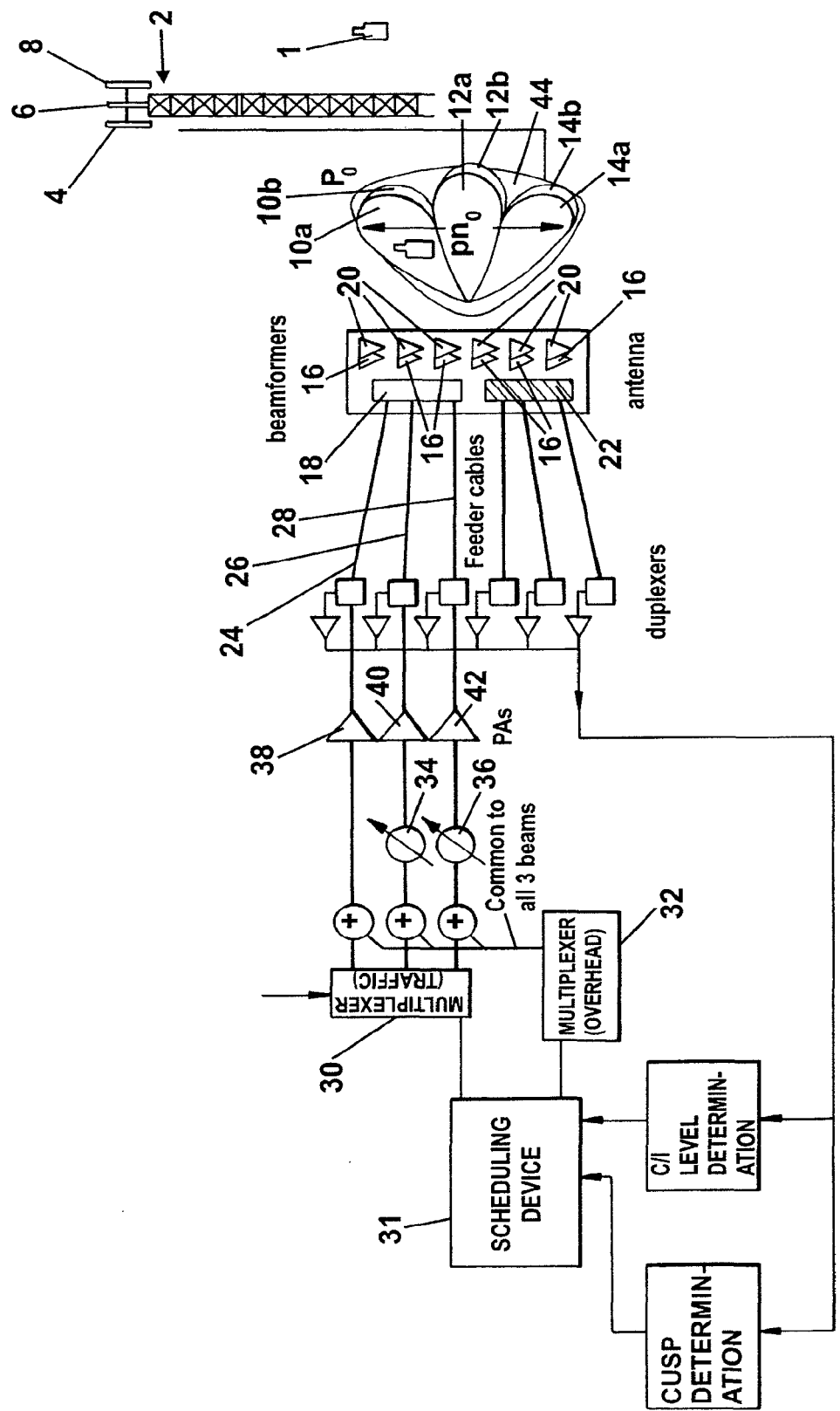
FIG. 1 shows an antenna arrangement for generating three narrow beams overlaid with a sector wide beam for providing coverage for a sector of a tri-sectored cell in accordance with the present invention.

FIG. 1 shows an antenna arrangement for providing coverage in one sector of a three sector cell of a cellular communication system, which cell is serviced by a base station (2). The base station (2) is equipped with three such antenna arrangements (4, 6, 8) off-set in azimuth angle by 120°, so that each antenna arrangement covers a sector of the cell. The antenna arrangement defines a first narrow transmit/receive beam (10a) and diversity receive beam (10b), a second narrow transmit/receive beam (12a) and diversity receive beam (12b), a third narrow transmit/receive beam (14a) and diversity receive beam (14b) and a full sector overlay transmit/receive beam (44). The generated antenna beam has three dual polar 22-degree beams (10, 12, 14) per sector with a full sector beam (44) overlayed. The beams (10a, 12a, 14a, 44) are formed by six columns of antenna elements (16) fed by a beamformer (18) and the beams (10b, 12b, 14b, 44) are formed by six columns of antenna elements (20) which feed a receive only beamformer (22).

The beamformer (18) has three ports each connected to a corresponding line (24, 26, 28). The respective lines carry the data traffic to be transmitted by corresponding beams (10a, 12a, 14a) and also the signal received by corresponding beams (10a, 12a, 14a). The traffic to be transmitted on the respective beams is allocated and fed to each line by a multiplexer (30). Then the overhead channels, such as the pilot, paging and synchronisation channels which are common to all the beams are added to each of the three times (24, 26, 28) by a multiplexer (32). Care must be taken to ensure phase coherency between the overhead signals and the traffic signals. A phase offset is applied to two of the input lines (26, 28) by phase shifters (34, 36) so as to reduce pilot interference, in accordance with the teaching of McGowan et al referred to above. The signals on the lines (24, 26, 28) are then upconverted by chanellizer elements and then amplified by power amplifiers (38, 40, 42). At the duplexers, the transmit signals are multiplexed onto the same line as the receive signal for each beam.

The multiplexers (30, 32) are controlled by a scheduling device (31). The scheduling device (31) may be part of the base station and schedules overhead channels, voice channels and data traffic channels to codes of timeslots to be transmitted over the beams (10, 12, 14). The scheduling device (31) may be a digital signal processor on which appropriate computer readable material or software is installed for controlling scheduling.

One pilot signal is common to the sector, with a single scrambling code modulated onto the pilot. This is achieved by transmitting the same pilot signal on all the narrow beams (10, 12, 14) simultaneously to effectively create a pilot signal which is transmitted on the sector wide beam (44). Accordingly, no changes are required to pilot planning and no changes in pilot pollution are experienced as compared to conventional tri-cellular networks. Pilots have two functions. The first is that they act as a beacon identifying the base station by the scrambling code which is modulated onto the pilot. The mobile station monitors every pilot in its active list, generally eight of them, and reports carrier/interference of the best pilot signal and the scrambling code of the best pilot signal to the base station transmitting that pilot signal. In this way a suitable cell sector for voice and data users is selected. The mobile station (1) also uses the pilot of the serving base station sector as a phase reference for demodulation. For this purpose, the pilot must have good carrier/interference levels and must be in phase with the narrow beams (10, 12, 14) on which the data traffic is carried.

The reverse link strategy employed is that the inputs from the three narrow beams (10b, 12b, 14b) and the three narrow beams (10b, 12b, 14b) are fed to a modem (not shown). The modem performs maximal ratio combining on the six inputs.

Figure 2A:
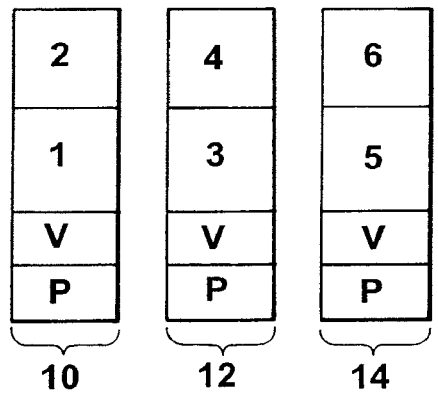
FIG. 2A shows the partitioning of the Walsh coding in three time slots sent simultaneously on the three beams of the antenna arrangement of FIG. 1, which time slots carry data to six mobile stations with two of the mobile stations located in the centre of each fixed beam.
Figure 2B:
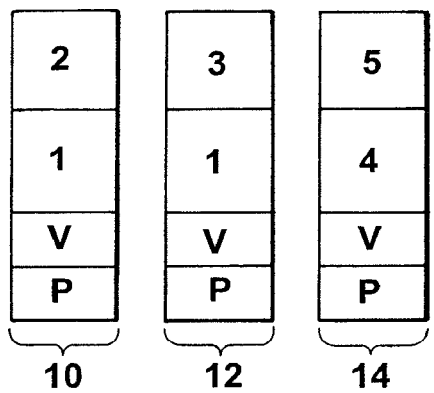
FIG. 2B shows the partitioning of the Walsh coding in three time slots sent simultaneously on the three beams of the antenna arrangement of FIG. 1, which time slots carry data to five mobile stations with one of the mobile stations located in the cusp between two fixed beams.
Figure 2C:
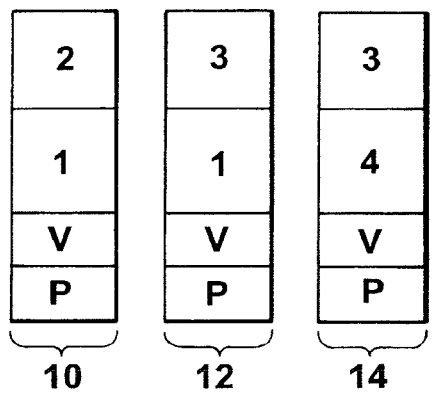
FIG. 2C shows the partitioning of the Walsh coding in three time slots sent simultaneously on the three beams of the antenna arrangement of FIG. 1, which time slots carry data to four mobile stations with one of the mobile stations located in each of the two cusps between the three fixed beams.

FIGS. 2A to 2C each show one set of three timeslots which are transmitted on the three beams (10, 12, 14) simultaneously. Each time slot is typically sprit into 32 orthogonal Walsh codes, although an alternative is to use 16 Walsh codes in each time slot. The same 32 Walsh codes are re-used in each beam. Referring now to FIGS. 2A to 2C, a sun-set P, for example 2 of the 32 used orthogonal Walsh codes are allocated for the overhead channels and are common to the three fixed beams (10, 12, 14). For example, as described above, the same pilot signal is sent on an overhead channel simultaneously on all the narrow beams in the sector.

A second sub-set V, for example 2 of the 32 used orthogonal Walsh codes are allocated for power-controlled channels, such as voice channels and are transmitted on one, two or all three of the narrow beams, depending on whether the mobile station assigned that channel is in handoff between beams, i.e. there is no re-use of these Walsh codes for other mobile stations in the three fixed beams. That is, the same voice signal is sent on the same voice channel on one, two or all 3D three of the narrow beams in the sector. Thus, voice traffic to a mobile station is transmitted on one or more of the narrow beams, but the code the voice traffic is assigned to is not re-used elsewhere in the sector.

The re-use of Walsh codes according to the present invention is unable to support voice communications because of the increased levels of interference that result.

The remaining Walsh codes, for example 28 of the 32 used Walsh codes are allocated to data traffic. Theses remaining Walsh codes may be split, for example into two blocks of 14 Walsh codes.

This allocation of Walsh codes in timeslots to different traffic, or scheduling, is carried out by the scheduling device (31) of the base station (2). The scheduling device may comprise a digital computing device on which appropriate computer readable media or software for controlling scheduling has been installed.

With the allocation shown in FIG. 2A, it is possible to simultaneously, i.e. within the same time slot period, transmit data to six mobile stations 1 to 6 within the sector covered by the three beams (10, 12, 14). In the beam (10) two mobile stations 1 and 2 are centrally located and each mobile station is allocated one of the two blocks of Walsh codes. Thus, data traffic to mobile station 1 is transmitted in a first block of the Walsh codes (identified by '1' in FIG. 2a) in the time slot on beam (10) and data traffic to mobile station 2 is transmitted in a second block of the Walsh codes (identified by '2' in FIG. 2a) in the time slot on beam (10). In the beam (12) two mobile stations 3 and 4 are centrally located and each mobile station is allocated one of the two blocks of Walsh codes. In the beam (14) two mobile stations 5 and 6 are centrally located and each mobile station is allocated one of the two blocks of Walsh codes.

With the allocation shown in FIG. 2B, it is possible to simultaneously, i.e. within the same time slot period, transmit to five mobile stations 1 to 5 within the sector covered by the three beams (10, 12, 14). In the beam (10) one mobile station 2 is centrally located and is allocated one of the two blocks of Walsh codes. The other block of Walsh codes is allocated to one mobile station 1 which is located in the cusp between the beam (10) and the beam (12). In the beam (12), in accordance with the hand-off procedures described below between the three beams, the same one of the two blocks of Walsh code is allocated to the mobile station 1 located within the cusp between the beam (10) and the beam (12). In this way the same data traffic is transmitted simultaneously in the same block of Walsh codes on the same time slot in beam (10) and beam (12) to the mobile station 1. The remaining block of Walsh codes in that time slot for beam (12) is allocated to a mobile station 3 located centrally in the beam (12). In the beam (14) two mobile stations 4 and 5 are centrally located and each mobile station is allocated one of the two blocks of Walsh codes.

With the allocation shown in FIG. 2C, it is possible to simultaneously, i.e. within the same time slot period, transmit to four mobile stations 1 to 4 within the sector covered by the three beams (10, 12, 14). In the beam (10) one mobile station 2 is centrally located and is allocated one of the two blocks of Walsh codes. The other block of Walsh codes is allocated to one mobile station 1 which is located in the cusp between the beam (10) and the beam (12). In the beam (12), in accordance with the handoff procedures described below between the three beams, the same one of the two blocks of Walsh code is allocated to the mobile station 1 located within the cusp between the beam (10) and the beam (12). In this way the same data is transmitted simultaneously in the same block of Walsh codes on the same time slot in beam (10) and beam (12) to the mobile station 1. The remaining block of Walsh codes in that time slot for beam (12) is allocated to a mobile station 3 located in the cusp between the beam (12) and the beam (14). In accordance with the hand off procedures described below between the three beams, the same one of the two blocks of Walsh code for the beam (14) is allocated to the mobile station 3 located within the cusp between the beam

(12) and the beam (14). In this way the same data is transmitted simultaneously in the same block of Walsh codes on the same time slot in beam (12) and beam (14) to the mobile station 3. In the beam (14) one mobile station 4 is centrally located and is allocated the remaining one of the two blocks of Walsh codes for beam (14).

Accordingly, it can be seen that the re-use of Walsh codes in the three beams (10, 12, 14) allows significantly more traffic to be carried by the beams. The spatial separation of the beams is relied upon for time slots transmitted on the separate beams to be distinguished. This increases the capacity of a cellular communication network adopting the present invention without causing additional pilot codes to be used and hence without increasing pilot signal interference.

In FIG. 2A, the mobile station 1 is located centrally in the narrow beam (10) and so data traffic is sent to it on blocks of Walsh codes in timeslots transmitted by the beam (10) only. As the mobile station moves towards the region covered by the beam (12) it enters a cusp region between the beams (10) and (12). The carrier/interference level in the transmissions to the mobile station 1 on the beam (10) will become worse due to interference from the beam (12). With the mobile station located within the cusp region the problem can occurs that the mobile station 1 which should be demodulating data traffic in a designated block of Walsh codes in a time slot of the beam (10) may sometimes demodulate data traffic on the same block of Walsh codes and same time slot but of the beam (12). To avoid this problem, when a base station identifies that the mobile station is entering a cusp region [Box A of FIG. 6] a handoff procedure is initiated in which, as shown in FIG. 2B, the same traffic data is sent to mobile station 1 in the same block of Walsh codes and in the simultaneously transmitted time slots of both adjacent beams (10) and (12) [Box B of FIG. 6]. Then, the mobile station will demodulate the combined signal from the designated block of Walsh codes transmitted on beam (10) and the designated block of Walsh codes transmitted on beam (12). The mobile station is highly likely to receive the data traffic sent on the two beams because the main source of interference (i.e. the adjacent beam) now contributes to the wanted signal power. A base station can identify when a mobile station enters a cusp region by measuring the receive power on each beam for signals from that mobile station and finding the power to be similar in two adjacent beams. If the mobile station continues to move in the direction of the region covered by the beam (12), it moves out of the cusp region between the adjacent beams (10) and (12). When the base station identifies that the mobile station 1 has left the cusp region and has entered a central portion of the beam (12), the handoff procedure is halted and the mobile station 1 is sent data traffic on designated blocks of Walsh code on time slots of beam (12) only.

In one known prior art implementation of a multi-beam system in accordance with McGowan et al but where the Walsh codes are not reused in this way, a maximum of two mobile stations (not including mobile stations using power-controlled channels) can be transmitted to in a sector covered by the multiple beams in a time slot. The first mobile user is allocated a first block of the sub-set of Walsh codes used for carrying traffic within the sector and the second mobile user is allocated the remaining block. This means that traffic cannot be sent on all beams at all times and in the prior art implementation only those beams of the multi-beam system on which traffic is to be sent in a time slot are illuminated for that time slot. This has the advantage of reducing interference within the system. However, Adaptive Modulation and Coding (AMC) cannot be fully utilised in such a system because the level of interference is not stable over time.

In the examples given above in relation to FIGS. 2A to 2C the sub-set of Walsh codes which are re-used in the three beams (10, 12, 14) are split into two blocks. This is the convention in accordance with current standards and is adopted in order to keep the signalling overhead to an acceptable level. If the sub-set of Walsh codes are further sub-divided, then more signalling messages to mobile stations will be required to notify the mobile stations of their allocations of Walsh code blocks. However, with the development of the technologies involved, it may become advantageous to sub-divide the sub-set of re-used Walsh codes in a time slot into more than two blocks.

Figure 3:
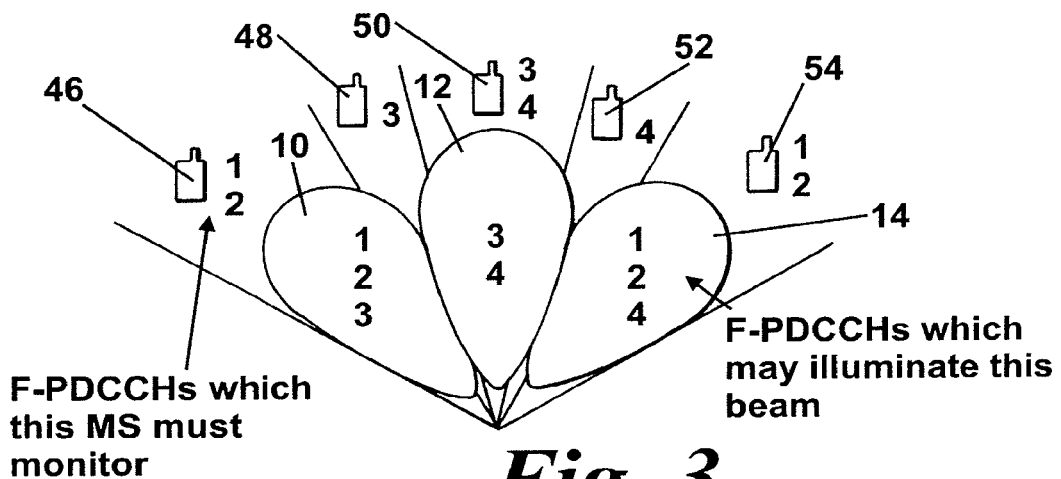
FIG. 3 shows a scheme for allocating packet data control channel codes to the beams of the antenna arrangement of FIG. 1.

As described above in relation to FIGS. 2A to 2C, up to six mobile stations may be scheduled simultaneously within a sector and so in the worst case six length 64 Walsh codes (in accordance with the 1xEV-DV standard) are required for F-PDCCH (Forward-Packet Data Control Channels). This number can be reduced In accordance with FIG. 3 by re-using the same F-PDCCH code in outer beams which have spatial separation. Current standards provide mobile stations that can support two F-PDCCH codes simultaneously. In the scheme shown in FIG. 3, four F-PDCCH codes are required per sector, which codes are labelled 1 to 4 in FIG. 3. Each F-PDCCH code is transmitted on two of the three beams (10, 12, 14). The F-PDCCH codes 3 and 4 transmit the same data from adjacent beams, i.e. beams pairs (10, 12) and (12, 14) and can be used to control packet data traffic to a mobile system in handover between adjacent beams. The F-PDCCH codes 1 and 2 transmit different data (i.e. they control different mobile stations) in the two outer beams (10) and (14) by relying on the spatial separation of the different mobile stations (46, 54) controlled. The set of F-PDCCH codes which the mobile station must monitor is dependent on the position of the mobile station within the sector. For example, in FIG. 3, mobile station (46) which is central to the beam (10) monitors codes 1 and 2, mobile station (48) which is in handover between beams (10) and (12) monitors code 3, mobile station (50) which is central to the beam (12) monitors codes 3 and 4, mobile station (52) which is in handover between beams (12) and (14) monitors code 4 and mobile station (54) which is central to the beam (14) monitors re-used codes 1 and 2. It should be noted that many alternative schemes for the packet data control channel can be devised.

The system according to the present invention in which a sub-set of Walsh codes are re-used in each of the fixed beams (10, 12, 14) within the sector is optimised for systems employing Adaptive Modulation and Coding (AMC) such as the 3G (third generation) evolution standards 1xEV-DV (1x EVolution-Data and Voice), 1xEV-OO (1xEVolution-Data Only) and HSDPA (High Speed Data Packet Access an extension to UMTS). 1xEV-DV is an evolution of CDMA2000 1x designed to significantly improve system capacity for mixed voice and data traffic. The 1xEV-DV air interface, although entirely compatible with the 18-95 and CDMA2000 1x standards does have a number of key differences. A first is the 'shared channel' concept in which, instead of allocating a sub-set of Walsh codes to a mobile station for all time, a sub-set of Walsh codes can be allocated to a mobile station per time slot. A second is Adaptive Modulation and Coding (AMC), which AMC measures the prevailing level of interference and depending on the measured level allocates a level of modulation and coding.

Figure 4:
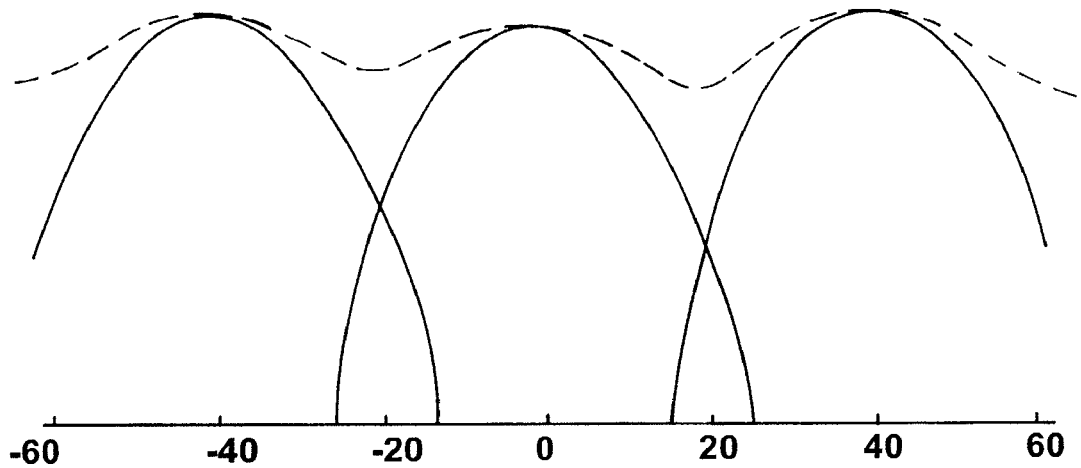
FIG. 4 shows schematically, the main beam pattern for the three fixed beams (in full lines) and the main beam pattern for the sector wide beam (in dotted lines) for the antenna arrangement of FIG. 1.

The benefits of AMC can be optimised by the use of a system according to the present invention, because the three beams are illuminated simultaneously and so the interference occurring on the three beams (10, 12, 14) is approximately stable between the measurement of the interference environment and the application of an appropriate level of modulation and coding. This is not the case in the prior art system in which selected narrow beams in a sector are illuminated or powered down depending on where the mobile station is. The base station determines the carrier/interference level on the sector wide pilot channel based on measures it receives from the mobile stations receiving the pilot channel [Box Y of FIG. 7A]. In response to the determined carrier/interference level appropriate levels of modulation and coding are applied to the signals transmitted on the beams covering the sector [Box Z of FIG. 7A]. Thus, the AMC in the present system relies on a pilot signal which is common to all beams, and so has a beam pattern shown schematically by dotted fines in FIG. 4, to measure the interference environment of the beams (10, 12, 14) the patterns of which are shown in solid lines in FIG. 4.

Therefore, the measured interference environment does not take into account adjacent beam interference. Thus, the level of interference measured for mobile stations, in particular where they are located at the cusp between two adjacent beams, is not as accurate as is ultimately desirable. Thus, the handoff procedures between adjacent beams described above have to be implemented in order to adequately support the mobile stations located at the cusps between the beams. The application of AMC, appropriate scheduling and the inter-beam handoff procedures enables potentially poor carrier/interference levels due to the re-use of Walsh codes in adjacent beams to be overcome for data traffic.

The potentially poor carrier/interference levels which can be experienced by the re-use of Walsh codes in adjacent beams is not consistent with voice communications. Also, AMC is not suitable for use with voice traffic. This is why the Walsh codes allocated voice traffic are not re-used across the beams (10, 12, 14) in a sector. For the data traffic transmitted over the three beams (10, 12, 14) it matters little if the wrong beam is chosen for transmission to a mobile station, provided this error is only on an occasional time slot. This is very different from a voice call where a drop would occur.

In the system described above there is no discrimination between reused Walsh codes on adjacent beams apart from the spatial separation of the beams. If the mobile station is located at a cusp between adjacent beams then there is a risk that the wrong beam transmission will be demodulated by the mobile station. This is mitigated by a handover procedure between adjacent beams in which the same data is sent simultaneously on adjacent beams, just for the time that the mobile station is in the beam cusp region, as is illustrated in FIGS. 2B, 2C and 6.

The risks associated with demodulating a data packet from the wrong beam pose a significant problem because each such data packet would pass physical layer error checking (for example, parity check, cyclic redunancy check, etc.) and thus would not be flagged as an error. The error would thus propagate to higher layers) making the time delay before which the error is detected larger, with the consequent increased loss of packets, which would have to be re-sent. This means that a conservative approach to handoff is appropriate meaning that the mobile stations will often be in handoff. However, if duplicate data has to be sent on adjacent beams for a large proportion of time, then the capacity improvement afforded by the re-use of the Walsh codes is reduced.

Figure 5:
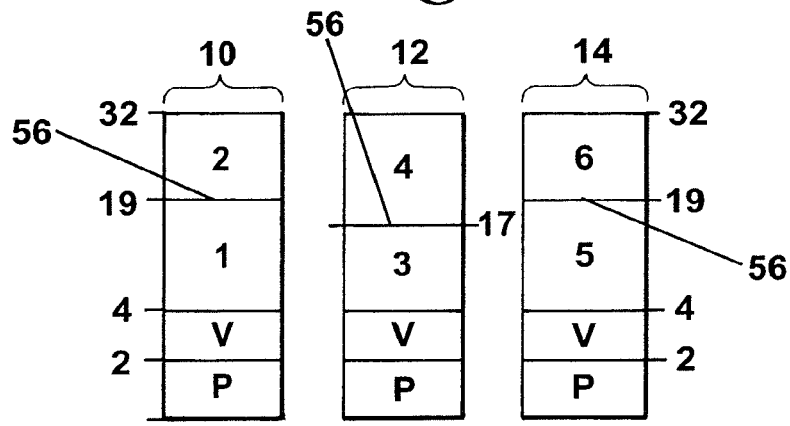
FIG. 5 shows the partitioning of the Walsh coding in three time slots sent simultaneously on the three beams of the antenna arrangement of FIG. 1, which partitioning is similar to that of FIG. 2A except that the two blocks of Walsh codes for data traffic have different breakpoints in adjacent beams.

This problem can be limited by applying the scheme illustrated in FIG. 5. In FIG. 5 two users are simultaneously scheduled in each of the beams (10, 12, 14), in the same way as is described above in relation to FIG. 2A. The control channel F-DPCCH informs them which block of the 28 Walsh codes allocated to data traffic each should demodulate in each time slot. The length of the block of codes to be demodulated is also notified to the mobile system on the control channel F-DPCCH. The breakpoint (56) between the two blocks of Walsh codes is located in a different position in adjacent beams. For example, in beam (10), codes 1 and 2 are allocated to the control channels, codes 3 and 4 are allocated to voice channels, codes 5 to 19 are allocated to data traffic for mobile station 1 and codes 20 to 32 are allocated to data traffic for mobile station 2. Therefore, the block to be demodulated by mobile station 1 is 15 codes long and the block to be demodulated by mobile station 2 is 13 codes long. Then, in beam (12), codes 1 and 2 are allocated to the control channels, codes 3 and 4 are allocated to voice channels, codes 5 to 17 are allocated to data traffic for mobile station 3 and codes 18 to 32 are allocated to data traffic for mobile station 4. Therefore, the block to be demodulated by mobile station 3 is 13 codes long and the block to be demodulated by mobile station 4 is 15 codes long. Therefore, if mobile station 1 in beam (10) were to decode its specified block of codes from the wrong beam's transmission, i.e. the block destined for mobile station 3 in beam (12), the block would be too short, at only 13 codes instead of the expected 15 codes and so will fail its physical layer error checking. Corrective action can be taken immediately, for example by re-transmitting the block of codes that should have been demodulated by mobile station 1 simultaneously on beams (10) and (12) to the mobile station 1. The time delay during which data is lost and has to be re-sent is reduced. Similarly, the breakpoint (56) in the timeslots simultaneously transmitted from beams (12) and (14) is offset. If it is ensured that the breakpoint (56) defining the boundary between blocks of Walsh codes is always at a different position in simultaneously transmitted time slots of adjacent beams then such errors will be detected quickly.

This allocation of Walsh codes in timeslots to data traffic so as to ensure that simultaneously transmitted data packets of different length are transmitted on adjacent beams, or scheduling, is carried out by the scheduling device (31) of the base station (2). The scheduling device may comprise a digital computing device on which appropriate computer readable media or software for controlling scheduling has been installed. The data packets, as described above are formed from subsets of orthogonal codes on timeslots transmitted on the beams.

The use of offset breakpoints is described above in relation to a sub-set of Walsh codes for CDMA based systems. However, the breakpoints could be defined as tones in Orthogonal Frequency Division Multiplexed (OFDM) or frequencies in Frequency Division Multiple Access/Time Division Multiple Access systems. That is, the set of tones or frequencies allocated to the system could be split into two sub-sets of tones or frequencies with the division between the sub-sets always set differently in adjacent beams. The use of such offset breakpoints is relevant to systems where spatial separation alone discriminates between adjacent beams.

As an alternative to the handover procedure described above, it is possible for each of the narrow beams to carry a unique auxiliary pilot signal In addition to a primary pilot signal being sent which is common to all of the beams in a multi-beam sector. The auxiliary pilots are used by the mobile stations to provide an accurate measurement of the interference environment for the individual beams which can be used for AMC and also provide an accurate pilot signal for channel estimation purposes. The mobile station will use the carrier level measured from the other beams within the same sector to correct the carrier/interference level measured on the strongest beam for that mobile station (i.e. the serving beam for that mobile station on which data traffic will be transmitted to it) in order to take account of the interference from adjacent beams within the sector. In this way the carrier/interference level on the auxiliary pilot channel of a beam is determined by the base station based on responses from the mobile stations services by that beam [Box Y of FIG. 78]. Then the base station applies appropriate modulation and coding to that beam. With more accurate AMC and channel estimation mobile stations can be handed over between beams without a handoff period in which the same data has to be sent to the mobile station on both beams. Although, the invention has been described above in relation to a fixed multi-beam system, it can also be applied to include a multi-beam system in which steered narrow beams are dynamically pointed so that the peak of the beam is directed at individual mobile stations. The basic concepts of overlay broadcast and pilot channels, re-use of Walsh codes in the narrow beams and the use of AMC and hand over remain the same for steered beam.

The invention claimed is:

1. A device in a cellular communication system, the device comprising:
    a beamformer generating multiple beams covering a cell sector and transmitting timeslots simultaneously over each of the multiple beams, the timeslots being each split into multiple codes, the multiple codes being divided into a first sub-set of codes and a second sub-set of codes, the first sub-set and the second sub-set being exclusive of one another,
    wherein the multiple beams contain data traffic messages including pilot channels sent to end user equipment, and each beam in the sector uses the first sub-set of codes to transmit first data traffic to end user equipment and the second sub-set of codes to transmit different data traffic to end user equipment using different beams in the sector to increase channel capacity.

2. The device of claim 1, wherein the multiple codes are multiple orthogonal codes.

3. The device of claim 1, wherein when an end user equipment is located in a cusp region between two adjacent beams of the beams, the beamformer sends data traffic for that end user equipment on the same second sub-set of codes simultaneously in at least two adjacent beams.

4. The device of claim 1, wherein based on carrier/interference levels on the pilot channels in the sector, signals are transmitted on the multiple beams using appropriate modulation and coding schemes.

5. The device of claim 1, in which a unique auxiliary pilot signal on each of the multiple beams is transmitted and using carrier/interference levels on auxiliary pilot channels of all beams within the sector, a carrier/interference level for the beam received at a highest power is determined, and signals are transmitted on a highest power beam using appropriate modulation and coding scheme.

6. The device of claim 5, wherein the carrier/interference level for the highest power beam is determined by subtracting carrier power of all other auxiliary pilots from a carrier level of the highest power beam.

7. The device of claim 1, wherein the second sub-set of codes allocated to different data traffic that are simultaneously transmitted over timeslots associated with adjacent beams include a different number of codes.

8. A cellular communication system comprising:
    an antenna arrangement having a beamformer for generating narrow beams covering a corresponding cell sector, the beamformer being arranged to simultaneously transmit timeslots over each of the narrow beams, the timeslots each being split into multiple codes, the multiple codes being divided into a first sub-set of codes and a second sub-set of codes that are exclusive of one another,
    wherein the multiple beams contain data traffic messages including pilot channels sent to end user equipment, and each beam in the sector uses the first sub-set of codes to transmit first data traffic to end user equipment and the second sub-set of codes to transmit different data traffic to end user equipment using different beams in the sector to increase channel capacity.

9. A communication system according to claim 8, wherein the multiple codes are multiple orthogonal codes.

10. A communication system according to claim 8, wherein when an end user equipment is located in a cusp region between two adjacent beams, the antenna arrangement sends data traffic for that end user equipment simultaneously on at least two adjacent beams.

11. A communication system according to claim 8, wherein based on carrier/interference levels on the pilot channel, appropriate modulation and coding is applied to the signals transmitted on the narrow beams.

12. A communication system according to claim 8, in which the antenna arrangement transmits a unique auxiliary pilot signal on each narrow beam; and using carrier/interference levels on auxiliary pilot channels of all beams within the sector, a carrier/interference level for a narrow beam received at a highest power in the sector is determined; and wherein signals are transmitted on the highest power narrow beam using appropriate modulation and coding scheme.

13. A communication system according to claim 12, wherein the carrier/interference level for the narrow beam received at the highest power is determined by subtracting a carrier power of all other auxiliary pilots from a carrier level of the highest power beam.

14. A communication system according to claim 8, wherein the second sub-set of codes allocated to different data traffic is divided into differently sized blocks of codes.

15. A base station in a cellular communication system, the base station comprising:
    one or more processors configured to generate narrow beams for covering a sector
    wherein the one or more processors further configured to simultaneously transmit different data traffic signals to end user equipment on each narrow beam of the sector by re-using a same set of codes such that an end user equipment located in the sector discriminates between the narrow beams only by a spatial separation of the narrow beams in the sector to facilitate an increase in capacity of the antenna arrangement.

16. The base station of claim 15, wherein when an end user equipment is located in a high interference region of the sector, same data traffic is transmitted simultaneously to the end user equipment on at least two adjacent beams of the sector using the same set of codes.

17. The base station of claim 15, wherein when an end user equipment is located in a cusp region between two adjacent beams of the array of narrow beams, the one or more processors configured to send data traffic for that end user equipment on the same set of codes simultaneously in at least the two adjacent beams.

18. The base station of claim 15, wherein the one or more processors are configured to transmit different data traffic signals simultaneously to end user equipments on all beams in the sector.

19. The base station of claim 15, wherein the same set of codes are orthogonal codes.

20. The base station of claim 15, wherein the same set of codes are Walsh codes.

* * * * *